United States Patent
Recio, III et al.

(10) Patent No.: US 11,884,878 B1
(45) Date of Patent: Jan. 30, 2024

(54) SUBSTITUTED AMINE ACID SALT ACTIVATION OF FURFURYL ALCOHOL-BASED RESINS

(71) Applicant: Halliburton Energy Services, Inc., Houston, TX (US)

(72) Inventors: Antonio Recio, III, Houston, TX (US); Aaron M. Beuterbaugh, Houston, TX (US); Josselyne Chano, Houston, TX (US); Philip D. Nguyen, Houston, TX (US); Michael Wayne Sanders, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/871,622

(22) Filed: Jul. 22, 2022

(51) Int. Cl.
  *C09K 8/575* (2006.01)
  *C09K 8/54* (2006.01)
(52) U.S. Cl.
  CPC .............. *C09K 8/575* (2013.01); *C09K 8/54* (2013.01)
(58) Field of Classification Search
  CPC .... C09K 8/575; C09K 8/5751; C09K 8/5753; C09K 8/5755; C09K 8/5758; C09K 8/57; C09K 8/565; C09K 8/56; C09K 8/54; E21B 43/02; E21B 43/025; E21B 43/261
  See application file for complete search history.

(56) References Cited

U.S. PATENT DOCUMENTS

| | | | |
|---|---|---|---|
| 3,199,590 A * | 8/1965 | Young | C09K 17/36 166/295 |
| 3,415,320 A * | 12/1968 | Young | C09K 8/56 507/263 |
| 3,625,287 A | 12/1971 | Young | |
| 3,700,604 A * | 10/1972 | Metil | C08L 71/14 523/211 |
| 3,759,327 A * | 9/1973 | Carnes | C09K 8/502 166/295 |

(Continued)

FOREIGN PATENT DOCUMENTS

| | | | |
|---|---|---|---|
| CN | 111410941 A | * | 7/2020 |
| GB | 697479 A | | 9/1953 |

OTHER PUBLICATIONS

Translation of CN-111410941-A (Year: 2020).*
International Search Report and Written Opinion dated Sep. 26, 2023 for PCT/US2023/025099.

*Primary Examiner* — Angela M DiTrani Leff
(74) *Attorney, Agent, or Firm* — Barnes & Thornburg, LLP

(57) ABSTRACT

Methods and fluids for consolidating unconsolidated particulates. An example method introduces a furfuryl alcohol-based resin treatment fluid into a wellbore; wherein the furfuryl alcohol-based resin treatment fluid is a furfuryl alcohol-based resin and a diluent. The method contacts the unconsolidated particulates within the wellbore with the furfuryl alcohol-based resin treatment fluid to produce resin-contacted unconsolidated particulates. The method further introduces a substituted amine acid treatment fluid into the wellbore after the introduction of the furfuryl alcohol-based resin treatment fluid into the wellbore; wherein the substituted amine acid treatment fluid is a substituted amine acid salt and a solvent. The method further contacts the resin-contacted unconsolidated particulates with the substituted amine acid treatment fluid.

10 Claims, 4 Drawing Sheets

(56) References Cited

U.S. PATENT DOCUMENTS

| | | | |
|---|---|---|---|
| 3,813,371 A * | 5/1974 | Bozer et al. | C08L 71/14 |
| | | | 525/352 |
| 4,042,032 A | 8/1977 | Anderson et al. | |
| 4,669,543 A | 6/1987 | Young | |
| 4,785,852 A * | 11/1988 | Okahashi | E21B 17/003 |
| | | | 138/109 |
| 4,785,884 A * | 11/1988 | Armbruster | E21B 43/267 |
| | | | 166/276 |
| 5,145,013 A * | 9/1992 | Dees | E21B 43/025 |
| | | | 166/299 |
| 5,763,559 A | 6/1998 | Black | |
| 6,177,484 B1 | 1/2001 | Surles | |
| 7,270,879 B2 | 9/2007 | McCrary | |
| 9,222,014 B2 | 12/2015 | Rickman et al. | |
| 9,909,404 B2 | 3/2018 | Hwang et al. | |
| 10,329,476 B2 | 6/2019 | Purdy et al. | |
| 10,822,535 B2 | 11/2020 | Purdy et al. | |
| 10,982,133 B2 | 4/2021 | Purdy et al. | |
| 11,168,246 B2 | 11/2021 | Purdy et al. | |
| 11,268,367 B2 | 3/2022 | Nguyen et al. | |
| 2002/0048676 A1* | 4/2002 | McDaniel | E01C 13/08 |
| | | | 428/407 |
| 2005/0006093 A1* | 1/2005 | Nguyen | C09K 8/706 |
| | | | 428/404 |
| 2006/0260810 A1* | 11/2006 | Weaver | C09K 8/68 |
| | | | 166/278 |
| 2016/0053161 A1 | 2/2016 | Maeda et al. | |
| 2016/0145486 A1* | 5/2016 | Weaver | C09K 8/40 |
| | | | 507/260 |
| 2022/0186105 A1 | 6/2022 | Shen et al. | |

* cited by examiner

SUBSTITUTED AMINE ACID SALT ACTIVATION OF FURFURYL ALCOHOL-BASED RESINS

TECHNICAL FIELD

The present disclosure relates generally to wellbore operations, and more particularly, to activating furfuryl alcohol-based resins with substituted amine acid salts for sand consolidation, hydraulic fracturing, fines control, and other wellbore operations that may utilize furfuryl alcohol-based resins.

BACKGROUND

Subterranean formations may contain unconsolidated particulates (e.g., sand, gravel, fines, etc.) that migrate with the produced oil, gas, and/or water. These particulates may damage wellbore equipment and reduce production of the desired wellbore fluid. Some migrating particulates may clog the wellbore, further hindering the production of the desired wellbore fluids. Preventing the migration of these unconsolidated particulates may mitigate the damage they can cause to the formation, the wellbore, and/or wellbore equipment.

In hydraulic fracturing operations, proppant is placed within a formed fracture in the subterranean formation. The proppant props the fracture thereby preventing the complete closure of the fracture while maintaining an opening for fluid flow out of the formation. In some hydraulic fracturing operations, the proppant may flow out of the fracture potentially causing issues during the formation of the proppant pack or proppant pillars. Preventing the migration of the proppant out of the fracture may help maintain a stable proppant pack in the fracture thus maximizing productivity of the formation. The use of the resin may enhance the stability of proppant pillars in pillar fracturing treatments.

The present disclosure provides improved methods and compositions for activating furfuryl alcohol-based resins with substituted amine acid salts for sand consolidation, hydraulic fracturing, fines control, and other wellbore operations that may utilize furfuryl alcohol-based resins.

BRIEF DESCRIPTION OF THE DRAWINGS

Illustrative examples of the present disclosure are described in detail below with reference to the attached drawing figures, which are incorporated by reference herein, and wherein.

Figure 1:
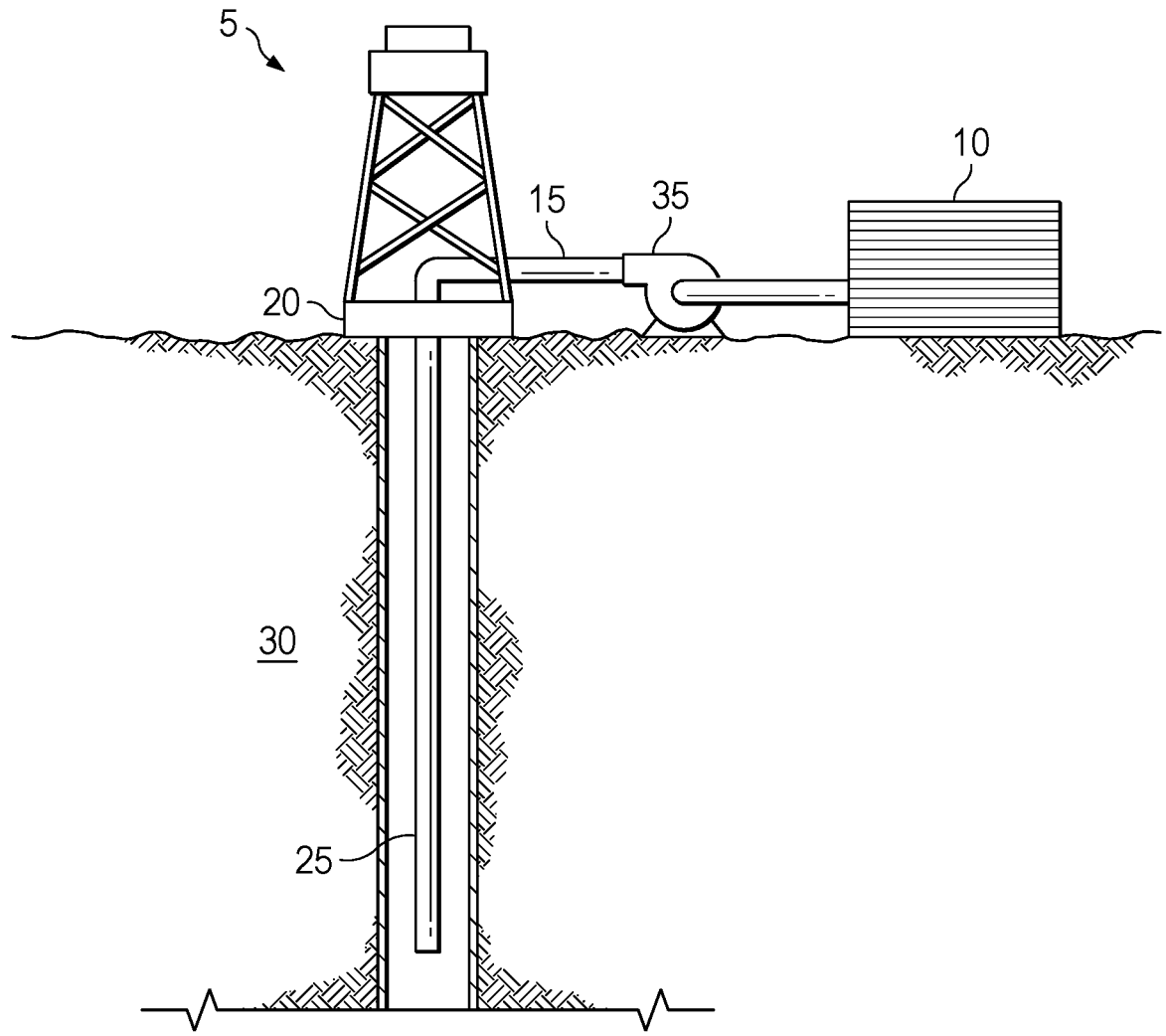
FIG. 1 is a schematic illustrating a system that can deliver treatment fluids in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to wellbore operations, and more particularly, to activating furfuryl alcohol-based resins with substituted amine acid salts for sand consolidation, hydraulic fracturing, fines control, and other wellbore operations that may utilize furfuryl alcohol-based resins.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples is defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The present disclosure relates generally to wellbore operations, and more particularly, to activating furfuryl alcohol-based resins with substituted amine acid salts for sand consolidation, hydraulic fracturing, fines control, and other wellbore operations that may utilize furfuryl alcohol-based resins. Furfuryl alcohol-based resins may be used to consolidate unconsolidated particulates within a wellbore, within an unconsolidated portion of a subterranean formation, or within a fracture formed in a subterranean formation. The term "unconsolidated particulates," and derivatives thereof, includes loose particulates and particulates bonded with insufficient bond strength to withstand the forces created by the production of fluids through the formation. Unconsolidated particulates may comprise, among other things, sand, gravel, fines, and/or proppant particulates (e.g., sand within a subterranean formation and/or man-made particulates placed in the subterranean formation in the course of a fracturing operation). The term "fines" refers to native as well as non-native particulates disposed within the subterranean formation and having a particle size of less than 100 microns. Fines may comprise any material of the subterranean formation or introduced previously into the subterranean formation including, but not limited to, silts, clays, very small particulates of sand, microproppant, and the like. The terms "unconsolidated subterranean formation" and "unconsolidated portion of a subterranean formation," and derivatives thereof include any formations that contain unconsolidated particulates, including subterranean fractures where unconsolidated particulates reside within the open space of the fracture (e.g., proppant within the fracture).

Advantageously, the use of substituted amine acid salts in consolidating operations may mitigate the potential salt tolerance and corrosivity issues which may occur when using hydrochloric acid ("HCl") activation. Presently, 10% HCl is the maximum concentration that may be used with a 15% sodium chloride ("NaCl") brine without precipitating the NaCl out of solution. The NaCl is important for the operation as it is used to prevent the partitioning of the furfuryl resin components into the aqueous phase, as well as to density match the various fluid stages thereby enabling sequential placement of each fluid stage. Increased concentrations of HCl would improve resin reactivity particularly as the clay content of the formation increases, but these increased concentrations also increase corrosivity and are not compatible with 15% NaCl solutions. Further, as the concentration of HCl increases, larger flush volumes may be needed to displace the HCl out of the wellbore which can lead to the displacement of unreacted resin into the formation thereby reducing the strength of the consolidated sand pack. These issues prevent the use of higher concentrations of HCl. Advantageously, the use of substituted amine acid salts reduces the corrosivity associated with HCl activation and reduces the need for post flushes after the substituted amine acid salt has been introduced. As another advantage, the substituted amine acid salt is introduced separately and subsequently from the furfuryl alcohol-based resin thereby preventing the premature activation of the resin (compared to epoxy resin treatments where the resin and hardener/catalyst are pumped at the same time). One further advantage is that the substituted amine acid salt provides improved unconfined compressive strength relative to similar concentrations of a HCl activator. Another advantage is that the reduced corrosivity of the substituted amine acid salt allows for a lesser volume of corrosion inhibitor to be used thereby reducing operational expenses and complexity. The substituted amine acid salt also possesses a high density (e.g., it may have a specific gravity of 1.1 thereby allowing for the sequential placement of the treatment fluid stages and a reduction in the potential for premature activation of the furfuryl alcohol-based resin due to premature mixing). One further advantage is that the substituted amine acid salt is effective in the consolidation of high clay content unconsolidated formations such as formations possessing 20% or greater clay (e.g., 20% to 50% clay). As the clay content of the formation increases, the activation of the furfuryl alcohol-based resin requires greater reactivity. This would necessitate that the HCl concentration be increased or that larger volumes of acid are pumped; however, the substituted amine acid salt maintains efficacy and efficiency at high clay concentrations. Another advantage is that the substituted amine acid salt possesses sufficient salinity thereby preventing solubilization of the furfuryl alcohol-based resins into the aqueous phase of the treatment fluid.

The substituted amine acid salt may be used to activate polymerization of the furfuryl alcohol-based resins in any operations in which furfuryl alcohol-based resins may be used. Examples of these operations include sand consolidation, fracturing, fines control, and the like.

FIG. 1 is an illustrative schematic of a system that can deliver treatment fluids of the present disclosure to a downhole location, according to one or more examples. It should be noted that while FIG. 1 generally depicts a land-based system, it is to be recognized that like systems may be operated in subsea locations as well. As depicted in FIG. 1, system 5 may include mixing tank 10, in which treatment fluids of the present disclosure may be formulated. The treatment fluids may be conveyed via line 15 to wellhead 20, where the treatment fluids then enter tubular 25. Treatment fluids of the present disclosure include both the furfuryl alcohol-based resin treatment fluid and the halogenated amine acid treatment fluid. The substituted amine acid salt is not present in the same treatment fluid as the furfuryl alcohol-based resin to prevent premature polymerization of the resin. Therefore, the substituted amine acid treatment fluid is introduced into tubular 25 after the furfuryl alcohol-based resin treatment fluid has been introduced into tubular 25. Tubular 25 extends from wellhead 20 into subterranean formation 30. Tubular 25 may include orifices that allow the treatment fluids to enter into a target area of the subterranean formation 30 or be simply ejected from tubular 25. Upon being ejected from tubular 25, the treatment fluids may disperse into the surrounding area, where they may enter a portion of the unconsolidated subterranean formation 30 to perform a sand consolidation operation. The sand consolidation operation may reduce the production of sand or other formation material during a subsequent production operation. Pump may be configured to raise the pressure of the treatment fluids to a desired degree before its introduction into tubular 25. It is to be recognized that system 5 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Figure 2:
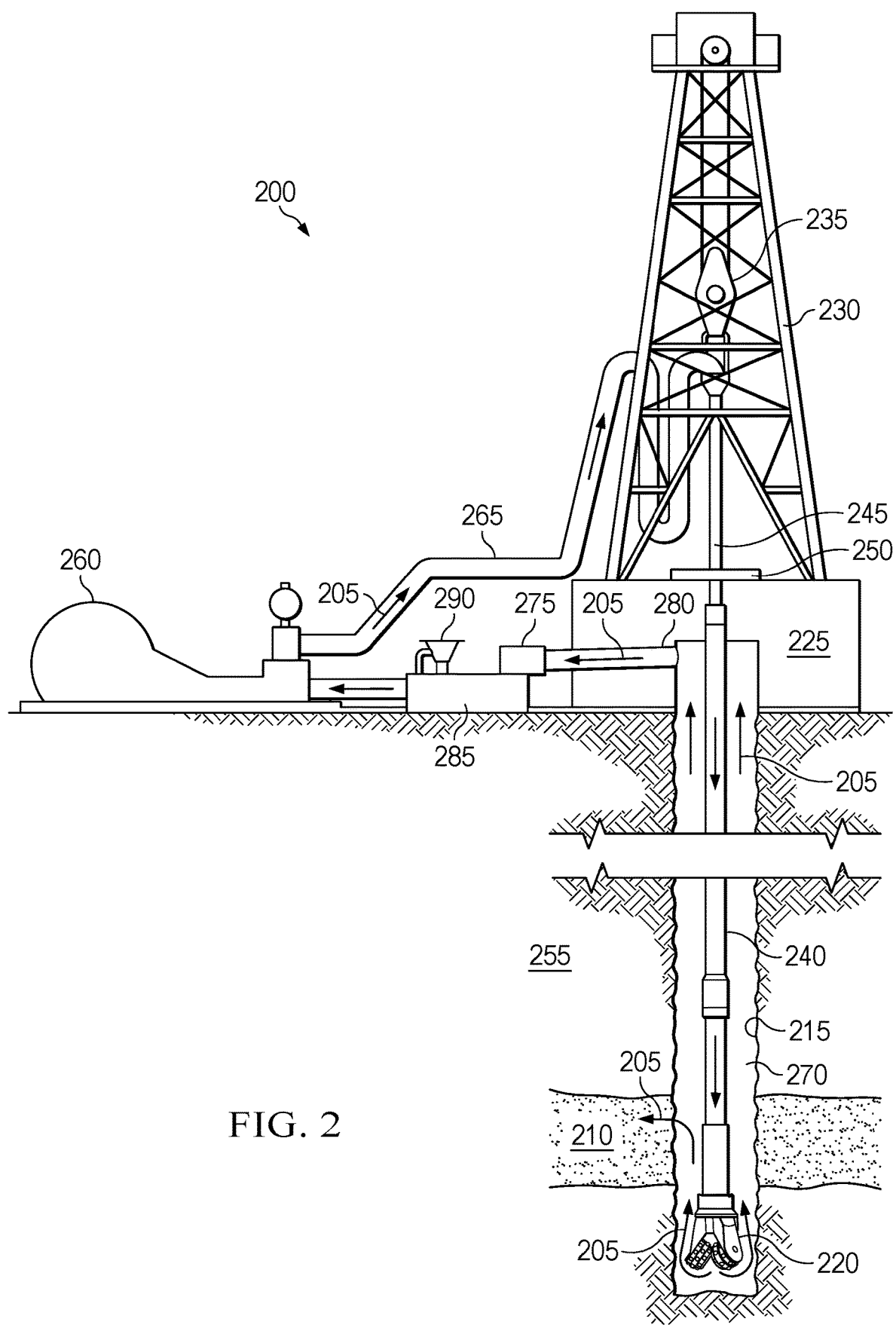
FIG. 2 is a schematic illustrating an example system for using a substituted amine acid treatment fluid in accordance with one or more examples described herein.

FIG. 2 is a schematic illustrating a system, generally 200, for using a substituted amine acid treatment fluid 205, as described herein. FIG. 2 illustrates an example technique for a sand consolidation operation with the introduction of the substituted amine acid treatment fluid 205 into a subterranean zone 210 after a furfuryl alcohol-based resin treatment fluid was introduced into wellbore 215 and dispersed within subterranean zone 210. It should be noted that while FIG. 2 generally depicts a land-based drilling assembly, those skilled in the art will readily recognize that the principles described herein are equally applicable to subsea drilling operations that employ floating or sea-based platforms and rigs, without departing from the scope of the disclosure. A furfuryl alcohol-based resin treatment fluid is introduced into wellbore 215 and pumped downhole until it exits the bottom hole assembly 220 where it then enters the subterranean zone 210 and contacts the unconsolidated particulates within. The unconsolidated particulates may comprise sandstone or other such formation materials that would release sand and/or other formation materials (e.g., clay, minerals, gravel, etc.) into the wellbore 215 during production. Subterranean zone 210 may also comprise a clay content of at least 5%. After the introduction of the furfuryl alcohol-based resin into wellbore 215, a substituted amine acid treatment fluid 205 is introduced into wellbore 215 and pumped downhole until it exits the bottom hole assembly 220 where it enters the subterranean zone 210 and contacts the resin-contacted unconsolidated particulates within. When the substituted amine acid treatment fluid 205 is placed in subterranean zone 210, the substituted amine acid treatment fluid 205 activates polymerization of the previously placed furfuryl alcohol-based resin resulting in the furfuryl alcohol-based resin binding the proximate resin-contacted unconsolidated particulates and consolidating the unconsolidated portion of the subterranean zone 210. This sand consolidation operation may be performed during the drilling of the wellbore as illustrated by FIG. 2, or during any other wellbore 215 phase such as completion and/or production.

With continued reference to FIG. 2, system 200 may include a drilling platform 225 that supports a derrick 230 having a traveling block 235 for raising and lowering a drill string 240. The drill string 240 may include, but is not limited to, drill pipe and coiled tubing, as generally known to those skilled in the art. A kelly 245 supports the drill string 240 as it is lowered through a rotary table 250. A bottom hole assembly 220 comprising a bit is attached to the distal end of the drill string 240 and is driven either by a downhole motor and/or via rotation of the drill string 240 from the well surface. As the bit of the bottom hole assembly 220 rotates, it creates a wellbore 215 that penetrates various subterranean formations 255.

A pump 260 (e.g., a mud pump) circulates a substituted amine acid treatment fluid 205 through a feed pipe 265 and to the kelly 245, which conveys the substituted amine acid treatment fluid 205 downhole through the interior of the drill string 240 and through one or more orifices in the bottom hole assembly 220. The substituted amine acid treatment fluid 205 is introduced after the introduction of the furfuryl alcohol-based resin treatment fluid (not shown) into the wellbore 215. The substituted amine acid treatment fluid 205 may then contact the unconsolidated portion of the subterranean zone 210 after the furfuryl alcohol-based resin has been dispersed within the subterranean zone 210. The substituted amine acid treatment fluid 205 that contacts subterranean zone 210 may contact the furfuryl alcohol-based resin dispersed within the subterranean zone 210 to induce polymerization of the furfuryl alcohol-based resin and to initiate consolidation of the unconsolidated particulates within the subterranean zone 210. Any substituted amine acid treatment fluid 205 that does not contact subterranean zone 210 may be circulated back to the surface, either with or without the presence of another fluid (e.g., a flush fluid) via annulus 270 defined between the drill string 240 and the walls of the wellbore 215. At the surface, the recirculated substituted amine acid treatment fluid 205 exits the annulus 270 and may be conveyed to one or more fluid processing unit(s) 275 via an interconnecting flow line 280. After passing through the fluid processing unit(s) 275, the substituted amine acid treatment fluid 205 may be deposited into a nearby retention vessel 285. While illustrated as being arranged at the outlet of the wellbore 215 via the annulus 270, those skilled in the art will readily appreciate that the fluid processing unit(s) 275 may be arranged at any other location in the system 200 to facilitate its proper function, without departing from the scope of the disclosure.

Additional treatment fluids may be introduced into wellbore 215 by system 200. For example, a flush fluid (e.g., a brine), may be introduced before and/or after the introduction of the furfuryl alcohol-based resin. As another example, a flush fluid may be introduced before and/or after the substituted amine acid treatment fluid 205. The flush fluid may comprise a monovalent brine or a divalent brine. Suitable monovalent brines include, but are not limited to, sodium chloride brines, sodium bromide brines, potassium chloride brines, potassium bromide brines, and the like. Suitable divalent brines include, but are not limited to, magnesium chloride brines, calcium chloride brines, and the like. The brine may comprise up to 20% salt in some examples. Generally, the brine comprises greater than a 1 M concentration of a halogenated Group I or II metal salt. The volume of brine introduced should be sufficient to displace the previously introduced fluid(s). Compared to sole HCl activation, the substituted amine acid treatment fluid 205 may not require a post flush brine or may use a lesser volume of post flush brine as the corrosivity relative to HCl is reduced.

The substituted amine acid treatment fluid 205 may be added to a mixing hopper 290 communicably coupled to or otherwise in fluid communication with the retention vessel 285. The mixing hopper 290 may include, but is not limited to, mixers and related mixing equipment known to those skilled in the art. In alternative examples, however, the substituted amine acid treatment fluid 205 may not be added to a mixing hopper 290. In at least one example, there could be more than one retention vessel 285, such as multiple retention vessel 285 in series. Moreover, the retention vessel 285 may be representative of one or more fluid storage facilities and/or units where the disclosed treatment fluids (either the substituted amine acid treatment fluid 205 or the furfuryl alcohol-based resin treatment fluid) may be stored, reconditioned, and/or regulated until desired for use.

The disclosed substituted amine acid treatment fluid 205 may directly or indirectly interact with the components and equipment of the system 200. For example, the disclosed substituted amine acid treatment fluid 205 may directly or indirectly interact with the fluid processing unit(s) 275 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 275 may further include one or more sensors, gauges, pumps, compressors, and the like used to store, monitor, regulate, and/or recondition the exemplary substituted amine acid treatment fluid 205.

The substituted amine acid treatment fluid 205 may directly or indirectly interact with the pump 260, which representatively includes any conduits, pipelines, trucks, tubulars, and/or pipes used to fluidically convey the substituted amine acid treatment fluid 205 downhole, any pumps, compressors, or motors (e.g., topside or downhole) used to drive the substituted amine acid treatment fluid 205 into motion, any valves or related joints used to regulate the pressure or flow rate of the substituted amine acid treatment fluid 205, and any sensors (e.g., pressure, temperature, flow rate, etc.), gauges, and/or combinations thereof, and the like.

The disclosed substituted amine acid treatment fluid 205 may also directly or indirectly interact with the mixing hopper 290 and the retention vessel 285 and their assorted variations.

The disclosed substituted amine acid treatment fluid 205 may also directly or indirectly interact with the various downhole equipment and tools that may come into contact with the substituted amine acid treatment fluid 205 such as, but not limited to, the drill string 240, any floats, drill collars, mud motors, downhole motors and/or pumps associated with the drill string 240, and any MWD/LWD tools and related telemetry equipment, sensors or distributed sensors associated with the drill string 240. The disclosed substituted amine acid treatment fluid 205 may also directly or indirectly interact with any downhole heat exchangers, valves and corresponding actuation devices, tool seals, packers and other wellbore isolation devices or components, and the like associated with the wellbore 215. The disclosed substituted amine acid treatment fluid 205 may also directly or indirectly interact with the drill bit of the bottom hole assembly 220, which may include, but is not limited to, roller cone bits, PDC bits, natural diamond bits, any hole openers, reamers, coring bits, etc.

While not specifically illustrated herein, the disclosed substituted amine acid treatment fluid 205 may also directly or indirectly interact with any transport or delivery equipment used to convey the substituted amine acid treatment fluid 205 to the system 200 such as, for example, any transport vessels, conduits, pipelines, trucks, tubulars, and/or pipes used to fluidically move the substituted amine acid treatment fluid 205 from one location to another, any pumps, compressors, or motors used to drive the substituted amine acid treatment fluid 205 into motion, any valves or related joints used to regulate the pressure or flow rate of the substituted amine acid treatment fluid 205, and any sensors (e.g., pressure and temperature), gauges, and/or combinations thereof, and the like.

It should be clearly understood that the examples illustrated by FIGS. 1-2 are merely general applications of the principles of this disclosure in practice, and a wide variety of other examples are possible. Therefore, the scope of this disclosure is not limited in any manner to the details of any of the FIGURES described herein.

Figure 3:
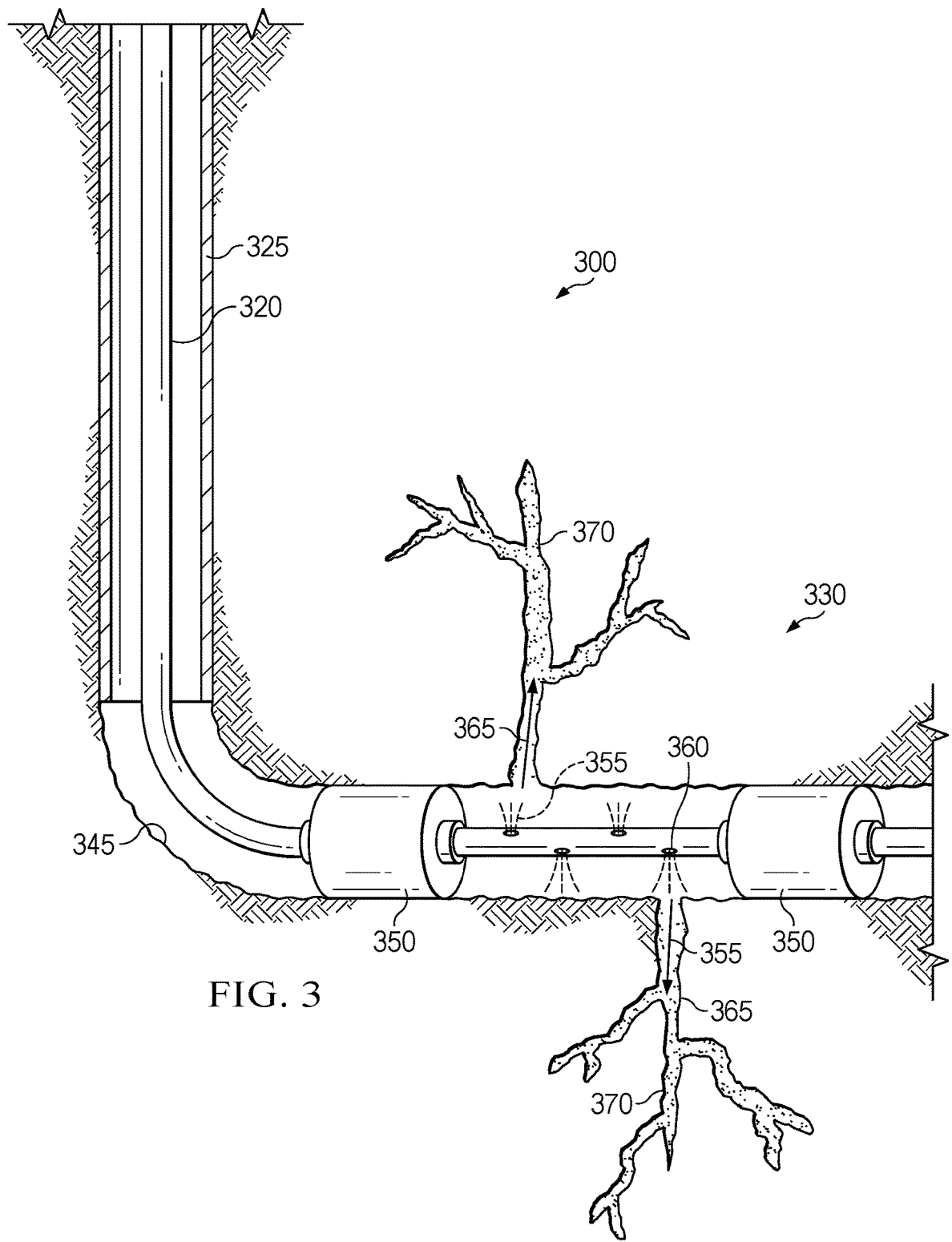
FIG. 3 is a schematic illustrating the downhole portion of a fracturing system in according to one or more examples in accordance with one or more examples described herein.

FIG. 3 illustrates a schematic of the downhole portion of a fracturing system 300 according to one or more examples. As depicted in FIG. 3, tubular 320 extends from the wellhead into wellbore 325 penetrating subterranean formation 330. After descending through the heel 345 of the wellbore 325, tubular 320 may be coupled to one or more packers 350 positioned to isolate an interval of wellbore 325. A fracturing fluid (e.g., a pad fluid, slickwater fluid, proppant-laden fluid, etc.) is introduced into wellbore 325 at a pump rate exceeding the fracture gradient of the subterranean formation 330. The fracturing fluid travels downhole via tubular 320 and then exits tubular 320 via openings 360. The fracturing fluid then creates or enhances one of more primary fractures 365. At some point in the fracturing operation, proppant 370 is introduced into the primary fracture 365 via one or more fracturing fluids and at least a portion of the proppant 370 remains in the primary fracture 365. A furfuryl alcohol-based resin treatment fluid is introduced into wellbore 325 and pumped downhole where it exits tubular 320 via openings 360. The furfuryl alcohol-based resin treatment fluid then flows into primary fracture 365 to contact and at least partially coat at least a portion of proppant 370. After the introduction of the furfuryl-alcohol based resin treatment fluid into wellbore 325, a substituted amine acid treatment fluid 355, as described herein, is introduced into wellbore 325 where it may exit tubular 320 through openings 360. The substituted amine acid treatment fluid 355 is introduced into the subterranean formation 330 via the primary fracture 365 in the subterranean formation 330. As the substituted amine acid treatment fluid 355 flows into the primary fracture 365, it contacts the previously placed proppant 370 which has been coated with a furfuryl alcohol-based resin. As the substituted amine acid treatment fluid 355 contacts the furfuryl alcohol-based resin, it activates polymerization of the furfuryl alcohol-based resin thereby resulting in a stable consolidation of the coated proppant 370. The consolidated proppant 370 forms a hardened proppant pack or several proppant pillars depending upon the type of propping operation. The proppant pack or proppant pillars prop the primary fracture 365 and as well as any secondary fractures and prevent the complete closure of the fractures by the surrounding pressure of the subterranean formation 330.

It should be clearly understood that the example illustrated by FIG. 3 is merely a general application of the principles of this disclosure in practice, and a wide variety of other examples are possible. Therefore, the scope of this disclosure is not limited in any manner to the details of FIG. 3 as described herein.

Figure 4:
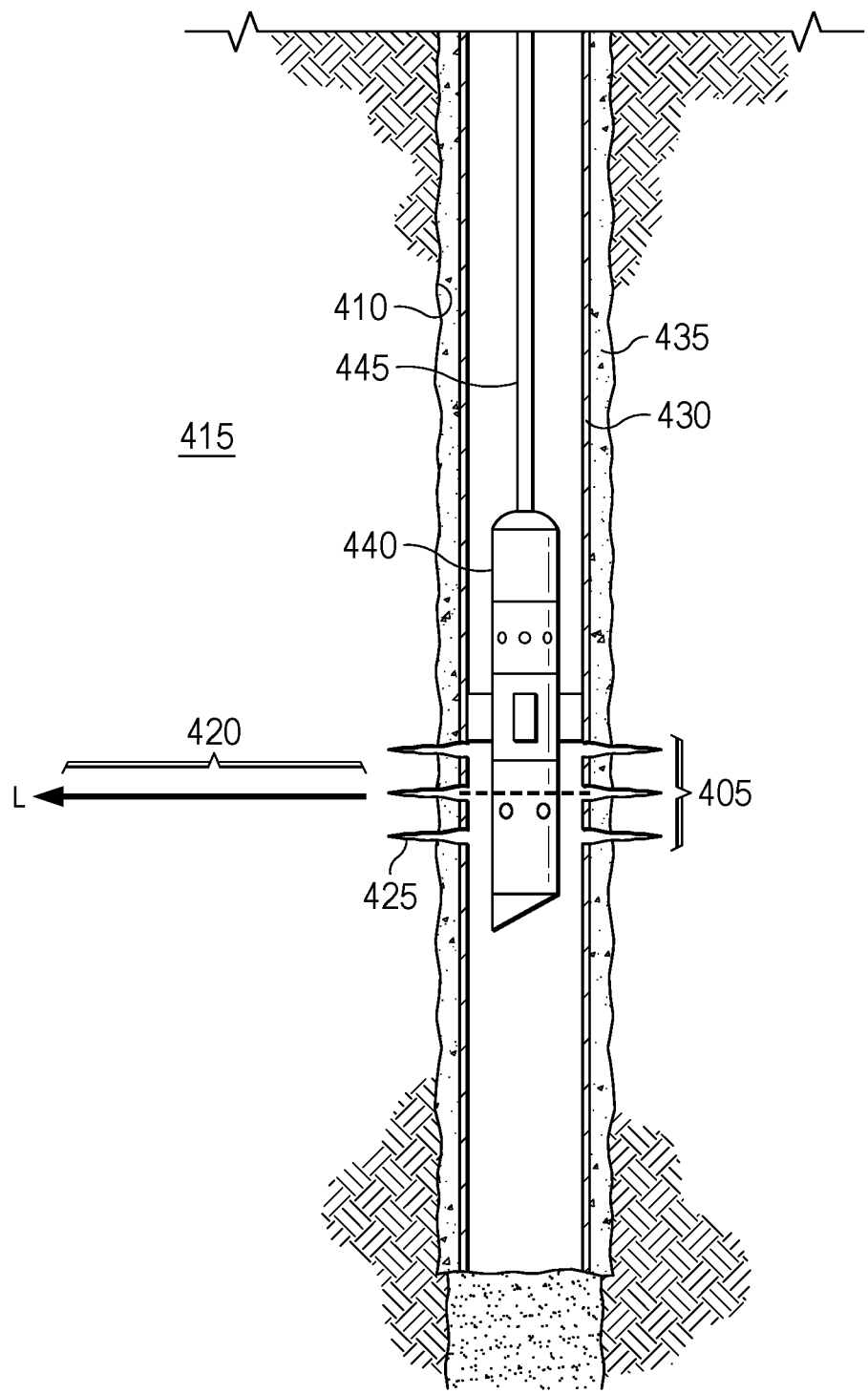
FIG. 4 is a schematic illustrating a primary resin treatment operation in accordance with one or more examples described herein.

FIG. 4 is a schematic illustrating a primary resin treatment operation in accordance with the examples disclosed herein. Completion of the well may include perforating a first interval 405 of the wellbore 410 to produce hydrocarbons from the surrounding subterranean formation 415. While FIG. 4 depicts the first interval 405 as being in a vertical wellbore, it is to be understood that first interval 405 may be at any suitable location in any type of wellbore 410, including horizontal wellbores, deviated wellbores, offshore wellbores, etc. Unconsolidated particulates such as sand may be produced from the hydrocarbon-bearing zone 420. These unconsolidated particulates may be produced and first detected during production or may be detected prior to production. In either case, the presence of the unconsolidated particulates necessitates conducting the consolidation operation.

In the illustrated example of FIG. 4, perforations 425 may be formed that penetrate through the casing 430 and the cement sheath 435 and into the subterranean formation 415. As will be discussed in more detail below, the portion of the hydrocarbon-bearing zone 420 surrounding the first interval 405 may then be treated through the perforations 425 with a furfuryl alcohol-based resin treatment fluid followed by a substituted amine acid treatment fluid to consolidate the unconsolidated particulates to prevent, or at least substantially reduce, the migration of the unconsolidated particulates from the hydrocarbon-bearing zone 420 into the wellbore 410. Moreover, the hydrocarbon-bearing zone 420 may have any suitable length (L) for the desired treatment. By way of example, the hydrocarbon-bearing zone 420 may have a length (L) in the range of from about 1 foot to about 50 feet. As the furfuryl alcohol-based resin treatment fluid does not cure and set until contacted by the halogenated amine acid treatment fluid, the furfuryl alcohol-based resin treatment fluid may be allowed to penetrate deeper into the hydrocarbon-bearing zone 420 (e.g., further along length (L) of the hydrocarbon-bearing zone 420) than with a treatment fluid that contained both the resin and the curing agent within.

While the first interval 405 may be perforated using any suitable technique, the illustrated example utilizes a jetting tool 440 to jet a fluid at high pressures. By way of example, when used to form the perforations 405, the jetting tool 440 should be configured to jet a fluid against the casing 430 and the cement sheath 435 such that perforations 425 may be formed. As illustrated, the jetting tool 440 may be coupled to a work string 445 (e.g., piping, coiled tubing, etc.) and lowered into the well bore 410 to the desired position.

Any suitable technique may be used for the delivery of the furfuryl alcohol-based resin treatment fluid and the substituted amine acid treatment fluid into the portion of the hydrocarbon-bearing zone 420 surrounding the first interval 405. For example, bull heading, coil tubing, or jointed pipe (e.g., with straddle packers, jetting tools, etc.), or any other suitable technique may be used. In certain examples, the furfuryl alcohol-based resin treatment fluid and the substituted amine acid treatment fluid may be injected into the hydrocarbon-bearing zone 420 by the jetting tool 440 while the jetting tool 440 is still in position in the well bore 410. Other examples may utilize packers, to isolate the treated interval (e.g., first interval 405) and then inject the furfuryl alcohol-based resin treatment fluid and the substituted amine acid treatment fluid through the perforations 425 of the isolated first interval 405 using bull heading, coil tubing, or jointed pipe (e.g., with straddle packers, jetting tools, etc.). In some alternative examples, the furfuryl alcohol-based resin treatment fluid and the substituted amine acid treatment fluid may be injected through the annulus between the work string 445 and the casing 430.

It is to be understood that a sufficient amount of the furfuryl alcohol-based resin treatment fluid and the substituted amine acid treatment fluid should be introduced such that the treatment fluids penetrate into the subterranean formation 415 to the desired length. The depth of penetration of the treatment fluids into the subterranean formation 415 will vary, for example, based on the particular application.

It should be clearly understood that the example illustrated by FIG. 4 is merely a general application of the principles of this disclosure in practice, and a wide variety of other examples are possible. Therefore, the scope of this disclosure is not limited in any manner to the details of FIG. 4 as described herein.

It is also to be recognized that the disclosed substituted amine acid treatment fluid may also directly or indirectly interact with the various downhole equipment and tools that may come into contact with the substituted amine acid treatment fluid during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in any of the FIGURES.

The substituted amine acid treatment fluid comprises a substituted amine acid salt and a solvent. Any suitable solvent may be used including aqueous and nonaqueous solvents. One example solvent is a brine. The substituted amine acid salt may include, but is not limited to, halogenated amine acid salts, sulfated amine acid salts, sulfonated amine acid salts, phosphated amine acid salts, phosphonated amine acid salts, nitrated amine acid salts, and any combination of amine acid salts. The substituted amine acid salt is the reaction product of an alkanolamine and a mineral acid (e.g., hydrochloric acid and a monoethanolamine) Examples of the alkanolamine may include, but are not limited to, monoethanolamine, monoisopropylamine, diethanolamine, triethanolamine, tetraethanolamine diamine, the like, and in any combination. Examples of the mineral acid include, but are not limited to, hydrochloric acid, sulfuric acid, phosphoric acid, nitric acid, boric acid, hydrofluoric acid, hydrobromic acid, perchloric acid, hydroiodic acid, the like, and in any combination. Alternative examples may use the combination of an amino acid and a mineral acid. In other alternative examples, urea may be combined with a mineral acid to form the substituted amine acid salt. In still other alternative examples, guanidine and its derivatives may be combined with a mineral acid to form the substituted amine acid salt. The ratio of the substituted amine acid salt to the furfuryl alcohol-based resin is in a range of about 2:1 to about 10:1. As a further example, the ratio of the substituted amine acid salt to the furfuryl alcohol-based resin may be 2:1, 3:1, 4:1, 5:1, 6:1, 7:1, 8:1, 9:1, or 10:1.

In some examples, the substituted amine acid treatment fluid may comprise only the substituted amine acid salt dissolved in a solvent with no additional fluids or additives. The substituted amine acid treatment fluid may thus consist of the solubilized substituted amine acid salt. The total concentration of the solubilized substituted amine acid salt in the substituted amine acid treatment fluid may range from about 0.01% (w/v) to about 100% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the solubilized substituted amine acid salt in the substituted amine acid treatment fluid may range from about 0.01% (w/v) to about 100% (w/v), from about 0.05% (w/v) to about 100% (w/v), from about 0.1% (w/v) to about 100% (w/v), from about 0.5% (w/v) to about 100% (w/v), from about 1% (w/v) to about 100% (w/v), from about 2% (w/v) to about 100% (w/v), from about 3% (w/v) to about 100% (w/v), from about 4% (w/v) to about 100% (w/v), from about 5% (w/v) to about 100% (w/v), from about 10% (w/v) to about 100% (w/v), from about 15% (w/v) to about 100% (w/v), from about 20% (w/v) to about 100% (w/v), from about 25% (w/v) to about 100% (w/v), from about 30% (w/v) to about 100% (w/v), from about 35% (w/v) to about 100% (w/v), from about 40% (w/v) to about 100% (w/v), from about 45% (w/v) to about 100% (w/v), from about 50% (w/v) to about 100% (w/v), from about 55% (w/v) to about 100% (w/v), from about 60% (w/v) to about 100% (w/v), from about 65% (w/v) to about 100% (w/v), from about 70% (w/v) to about 100% (w/v), from about 75% (w/v) to about 100% (w/v), from about 80% (w/v) to about 100% (w/v), from about 85% (w/v) to about 100% (w/v), from about 90% (w/v) to about 100% (w/v), or from about 95% (w/v) to about 100% (w/v). As another example, the concentration of the solubilized substituted amine acid salt in the substituted amine acid treatment fluid may range from about 0.01% (w/v) to about 100% (w/v), from about 0.01% (w/v) to about 95% (w/v), from about 0.01% (w/v) to about 90% (w/v), from about 0.01% (w/v) to about 85% (w/v), from about 0.01% (w/v) to about 80% (w/v), from about 0.01% (w/v) to about 75% (w/v), from about 0.01% (w/v) to about 70% (w/v), from about 0.01% (w/v) to about 65% (w/v), from about 0.01% (w/v) to about 60% (w/v), from about 0.01% (w/v) to about 55% (w/v), from about 0.01% (w/v) to about 50% (w/v), from about 0.01% (w/v) to about 45% (w/v), from about 0.01% (w/v) to about 40% (w/v), from about 0.01% (w/v) to about 35% (w/v), from about 0.01% (w/v) to about 30% (w/v), from about 0.01% (w/v) to about 25% (w/v), from about 0.01% (w/v) to about 20% (w/v), from about 0.01% (w/v) to about 15% (w/v), from about 0.01% (w/v) to about 10% (w/v), from about 0.01% (w/v) to about 5% (w/v), from about 0.01% (w/v) to about 4% (w/v), from about 0.01% (w/v) to about 3% (w/v), from about 0.01% (w/v) to about 2% (w/v), from about 0.01% (w/v) to about 1% (w/v), from about 0.01% (w/v) to about 0.5% (w/v), from about 0.01% (w/v) to about 0.1% (w/v), or from about 0.01% (w/v) to about 0.05% (w/v). With the benefit of this disclosure, one of ordinary skill in the art will be readily able to prepare a substituted amine acid treatment fluid having a sufficient concentration of a solubilized substituted amine acid salt for a given application.

In some optional examples, the substituted amine acid treatment fluid comprises an aqueous or nonaqueous base fluid in addition to the solvent. The base fluid may be from any source, provided that it does not contain an excess of compounds that may undesirably affect other components in the treatment fluid. In various examples, the base fluid may comprise fresh water, salt water, seawater, brine, an aqueous salt solution, or any hydrocarbon-based fluid. In some examples, the aqueous fluid may comprise a monovalent brine or a divalent brine. Suitable monovalent brines include, but are not limited to, sodium chloride brines, sodium bromide brines, potassium chloride brines, potassium bromide brines, and the like. Suitable divalent brines include, but are not limited to, magnesium chloride brines, calcium chloride brines, and the like.

The concentration of the base fluid in the substituted amine acid treatment fluid may range from about 0.5% (w/v) to about 99% (w/v). The concentration of the base fluid in the substituted amine acid treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the base fluid in the substituted amine acid treatment fluid may range from about 0.5% (w/v) to about 99% (w/v), from about 1% (w/v) to about 99% (w/v), from about 5% (w/v) to about 99% (w/v), from about 10% (w/v) to about 99% (w/v), from about 15% (w/v) to about 99% (w/v), from about 20% (w/v) to about 99% (w/v), from about 25% (w/v) to about 99% (w/v), from about 30% (w/v) to about 99% (w/v), from about 35% (w/v) to about 99% (w/v), from about 40% (w/v) to about 99% (w/v), from about 45% (w/v) to about 99% (w/v), from about 50% (w/v) to about 99% (w/v), from about 55% (w/v) to about 99% (w/v), from about 60% (w/v) to about 99% (w/v), from about 65% (w/v) to about 99% (w/v), from about 70% (w/v) to about 99% (w/v), from about 75% (w/v) to about 99% (w/v), from about 80% (w/v) to about 99% (w/v), from about 85% (w/v) to about 99% (w/v), from about 90% (w/v) to about 99% (w/v), or from about 95% (w/v) to about 99% (w/v). As another example, the concentration of the aqueous fluid in the substituted amine acid treatment fluid may range from about 0.5% (w/v) to about 99% (w/v), from about 0.5% (w/v) to about 95% (w/v), from about 0.5% (w/v) to about 90% (w/v), from about 0.5% (w/v) to about 85% (w/v), from about 0.5% (w/v) to about 80% (w/v), from about 0.5% (w/v) to about 75% (w/v), from about 0.5% (w/v) to about 70% (w/v), from about 0.5% (w/v) to about 65% (w/v), from about 0.5% (w/v) to about 60% (w/v), from about 0.5% (w/v) to about 55% (w/v), from about 0.5% (w/v) to about 50% (w/v), from about 0.5% (w/v) to about 45% (w/v), from about 0.5% (w/v) to about 40% (w/v), from about 0.5% (w/v) to about 35% (w/v), from about 0.5% (w/v) to about 30% (w/v), from about 0.5% (w/v) to about 25% (w/v), from about 0.5% (w/v) to about 20% (w/v), from about 0.5% (w/v) to about 15% (w/v), from about 0.5% (w/v) to about 10% (w/v), from about 0.5% (w/v) to about 5% (w/v), or from about 0.5% (w/v) to about 1% (w/v). With the benefit of this disclosure, one of ordinary skill in the art will be able to prepare a treatment fluid having a sufficient concentration of a base fluid for a given application.

In some optional examples, the substituted amine acid treatment fluid may comprise a corrosion inhibitor. The corrosion inhibitor may reduce the rate of corrosion of wellbore equipment from the halogenated amine acid treatment fluid. Examples of the corrosion inhibitor may include, but are not limited to, acetylenic alcohols, aromatic aldehydes, aliphatic aldehydes, alkylphenones, alkylated bisphenol compounds, amides, amines, quaternary amine salts, amine substituted heterocycles, imines, iminium salts, triazoles, pyridine derivatives, pyridinium derivatives, quinoline, quinoline analogs, thiourea-based compounds, thiosemicarbazides, thioisocyanates, and any combinations.

The total concentration of the corrosion inhibitor in the substituted amine acid treatment fluid may range from about 0.01% (w/v) to about 6% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the corrosion inhibitor in the substituted amine acid treatment fluid may range from about 0.01% (w/v) to about 6% (w/v), from about 0.05% (w/v) to about 6% (w/v), from about 0.1% (w/v) to about 6% (w/v), from about 0.5% (w/v) to about 6% (w/v), from about 1% (w/v) to about 6% (w/v), from about 2% (w/v) to about 6% (w/v), from about 3% (w/v) to about 6% (w/v), from about 4% (w/v) to about 6% (w/v), or from about 5% (w/v) to about 6% (w/v). As another example, the concentration of the corrosion inhibitor in the substituted amine acid treatment fluid may range from about 0.01% (w/v) to about 6% (w/v), from about 0.01% (w/v) to about 5% (w/v), from about 0.01% (w/v) to about 4% (w/v), from about 0.01% (w/v) to about 3% (w/v), from about 0.01% (w/v) to about 2% (w/v), from about 0.01% (w/v) to about 1% (w/v), from about 0.01% (w/v) to about 0.5% (w/v), from about 0.01% (w/v) to about 0.1% (w/v), or from about 0.01% (w/v) to about 0.05% (w/v). With the benefit of this disclosure, one of ordinary skill in the art will be readily able to prepare a treatment fluid having a sufficient concentration of a corrosion inhibitor for a given application.

In some optional examples, the substituted amine acid treatment fluid may comprise a corrosion inhibitor intensifier. Examples, of the corrosion inhibitor intensifier may include, but are not limited to, formic acid, a metal halide, a metal oxide, and any combination.

The total concentration of the corrosion inhibitor intensifier in the substituted amine acid treatment fluid may range from about 0.01% (w/v) to about 5% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the corrosion inhibitor intensifier in the substituted amine acid treatment fluid may range from about 0.01% (w/v) to about 5% (w/v), from about 0.05% (w/v) to about 5% (w/v), from about 0.1% (w/v) to about 5% (w/v), from about 0.5% (w/v) to about 5% (w/v), from about 1% (w/v) to about 5% (w/v), from about 2% (w/v) to about 5% (w/v), from about 3% (w/v) to about 5% (w/v), or from about 4% (w/v) to about 5% (w/v). As another example, the concentration of the corrosion inhibitor intensifier in the substituted amine acid treatment fluid may range from about 0.01% (w/v) to about 5% (w/v), from about 0.01% (w/v) to about 4% (w/v), from about 0.01% (w/v) to about 3% (w/v), from about 0.01% (w/v) to about 2% (w/v), from about 0.01% (w/v) to about 1% (w/v), from about 0.01% (w/v) to about 0.5% (w/v), from about 0.01% (w/v) to about 0.1% (w/v), or from about 0.01% (w/v) to about 0.05% (w/v). With the benefit of this disclosure, one of ordinary skill in the art will be readily able to prepare a treatment fluid having a sufficient concentration of a corrosion inhibitor intensifier for a given application.

The furfuryl alcohol-based resin treatment fluid comprises a furfuryl alcohol-based resin. The furfuryl alcohol-based resin treatment fluid is introduced into the wellbore prior to the introduction of the halogenated amine acid treatment fluid. The furfuryl alcohol-based resin is not added to the halogenated amine acid treatment fluid. The furfuryl alcohol-based resin treatment fluid comprises a combination of a preformed furfuryl alcohol polymer with a preferred viscosity specification range of about 400 centipoise (cP)+/− 200 cP and a diluent. In some examples, the viscosity specification range may be any value between 200 cP and 2000 cP. The diluent may comprise an aromatic aldehyde (e.g., benzaldehyde, anisaldehyde, trimethoxy benzaldehyde, halogenated benzaldehyde, and the like), or a heteroaromatic aldehyde (e.g., furfural, pyridine carboxaldehyde, pyrrole carboxaldehyde, thiophene carboxaldehyde, furan carboxaldehyde, etc.), or an aromatic alcohol acetate ester (e.g., phenyl acetate, furfuryl alcohol acetate, and the like), or an alkyl acetate ester (e.g., butyl acetate, hexyl acetate, and the like), or an aromatic alcohol (e.g., phenol, hydroxypyridine, benzyl alcohol, furfuryl alcohol, pyridinemethanol, and the like), or an aromatic ester (e.g., benzyl benzoate, and the like), or an ether alcohol mixture (e.g., monoalkyl ethylene glycol, monobutyl ethylene glycol, polyethyleneglycol monobutyl ether, and the like), or ethylene glycol derivatives (e.g., monoethyl glycol, polyethylene glycol, and the like), or any combination. Preferably the diluent is a combination of an ether alcohol and monoethylene glycol mixture. More preferably the diluent is furfural.

Optionally, the furfuryl alcohol-based resin treatment fluid may also comprise a wetting agent. Suitable wetting agents may include, but are not limited to, quaternized alkyl amine salts and quaternized polyamine salts that render the formation oil-wet (i.e., a reduced affinity to water). Examples of the wetting agent may include, but are not limited to, cetyl ammonium bromide, dimethyl ammonium bromide, benzyl ammonium bromide, cetyl ammonium chloride, dimethyl ammonium chloride, benzyl ammonium chloride, or any combination. The wetting agent may be used in the furfuryl alcohol-based resin treatment fluid in a concentration range from about 0.025% to about 10% (w/v).

Optionally, the furfuryl alcohol-based resin treatment fluid may also comprise a docking agent to improve the adhesion of the resin to the formation minerals. Specific examples of docking agents may include, but are not limited to, a 3-aminopropyltrimethoxysilane (APTMS), N-(6-aminohexyl)aminomethyltriethoxysilane (AHAMTES), N-(2-aminoethyl)-3-aminopropyltriethoxysilane (AEAPTES), and N-(2-aminoethyl)-3-aminopropyltrimethoxysilane (AEAPTMS). The docking agent may be used in the furfuryl alcohol-based resin treatment fluid in a concentration range from about 0.025% to about 10% (w/v).

In some examples, a flush fluid, also referred to as a spacer fluid, may be used before and/or after introduction of the furfuryl alcohol-based resin treatment fluid and/or the halogenated amine acid treatment fluid. The flush fluid may comprise a monovalent or divalent brine with a greater than 1 molar (M) concentration of a halogenated Group I or II metal salt. In sand consolidation or fines control operations, the furfuryl alcohol-based resin and the substituted amine acid salt may be used to consolidate unconsolidated particulates. The unconsolidated particulates may comprise, but are not limited to, sand, clay, rock, minerals, gravel, dirt, fines, or any other unconsolidated subterranean formation materials. These unconsolidated subterranean formation materials are a part of and reside within the subterranean formation itself and are not introduced, for example, as with proppants in a fracturing operation. As the unconsolidated particulates are a part of the subterranean formation, care should be taken to not damage the formation with the furfuryl alcohol-based resin and/or the substituted amine acid salt. As such, reduction of the volume of activator and flush fluids needed to perform the operations may result in less formation damage compared to traditional methods.

In hydraulic fracturing operations, the furfuryl alcohol-based resin and the substituted amine acid salt may be used to consolidate unconsolidated proppant particulates in a fracture formed within a subterranean formation. Examples of proppant may include, but are not limited to, sand, bauxite, fly ash, ceramic materials, glass materials, polymer materials, polytetrafluoroethylene materials, nutshell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. In some examples, the proppant may be further selected based on particle size and may be distinguished by the terms "large proppant" and "microproppant." For clarity and simplicity, as used herein, the term "microproppant" refers to proppant having a minimum diameter of 0.1 microns and having a number average diameter of about 0.5 microns to about 25 microns, including any subset therebetween (e.g., about 1 micron to about 10 microns). Further as used herein, the term "large proppant" refers to proppant having a number average diameter of about 75 microns to about 500 microns, including any subset therebetween (e.g., about 100 micron to about 250 microns, about 200 to about 500 microns, or about 150 to about 400 microns).

In some optional examples, the furfuryl alcohol-based resin treatment fluid and/or the substituted amine acid treatment fluid may comprise one or more additives. The additives may be used to adjust a property of the treatment fluid (e.g., viscosity, density, etc). Examples of the additives include, but are not limited to, silica scale control additives, corrosion inhibitors, surfactants, gel stabilizers, anti-oxidants, polymer degradation prevention additives, relative permeability modifiers, scale inhibitors, foaming agents, defoaming agents, antifoaming agents, emulsifying agents, de-emulsifying agents, iron control agents, nanoparticles, micro-proppants, proppants or other particulates, particulate diverters, salts, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, hydrate inhibitors, consolidating agents, bactericides, clay stabilizers, breakers, delayed release breakers, the like, or any combination thereof. With the benefit of this disclosure, one of ordinary skill in the art and the benefit of this disclosure will be able to formulate a treatment fluid having properties suitable for a desired application.

It is also to be recognized that the disclosed treatment fluids may also directly or indirectly interact with the various downhole equipment and tools that may contact the treatment fluids disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in the Figures.

EXAMPLES

The present disclosure may be better understood by reference to the following examples, which are offered by way of illustration. The present disclosure is not limited to the examples provided herein.

Example 1

Table 1 illustrates the results of an unconfined compressive strength test as a function of diluent, activator, and clay content. From the results, the use of a substituted amine acid salt resulted in an increased unconfined compressive strength compared to HCl even at clay content values of 20%. The setting temperature for all samples was 170° F. The unconfined compressive strength of the samples was measured at 42 hours.

TABLE 1

| Resin Diluent | Clay Content (%) | Activator | Unconfined Compressive Strength |
|---|---|---|---|
| Furfural | 5 | 10% HCl | 490 |
| Furfural | 5 | 15% HCl | 2483 |
| Furfural | 5 | Substituted amine acid salt | 3552 |
| 70 Musol/30 EG | 5 | 10% HCl | 1193 |
| 70 Musol/30 EG | 5 | 15% HCl | 2841 |
| 70 Musol/30 EG | 5 | Substituted amine acid salt | 3170 |
| Furfural | 20 | 15% HCl | 652 |
| Furfural | 20 | Substituted amine acid salt | 851 |

Example 2

Table 2 illustrates the results of a vial test of the unconfined compressive strength as a function of pore volume of activator used. From the results, the use of a substituted amine acid salt resulted in an increased unconfined compressive strength compared to HCl even at reduced pore volumes of activator used. The setting temperature for all samples was 175° F. The unconfined compressive strength of the samples was measured at 48 hours.

TABLE 2

| Clay Content (%) | Activator | Pore Volumes of Activator | Unconfined Compressive Strength |
|---|---|---|---|
| 5 | 10% HCl | 16 | 326 |
| 5 | 15% HCl | 16 | 1032 |
| 5 | Substituted amine acid salt | 6 | 1481 |

Provided are methods for consolidating unconsolidated particulates in accordance with the disclosure and the illustrated Figures. An example method comprises introducing a furfuryl alcohol-based resin treatment fluid into a wellbore; wherein the furfuryl alcohol-based resin treatment fluid comprises a furfuryl alcohol-based resin and a diluent. The method further comprises contacting the unconsolidated particulates within the wellbore with the furfuryl alcohol-based resin treatment fluid to produce resin-contacted unconsolidated particulates. The method further comprises introducing a substituted amine acid treatment fluid into the wellbore after the introduction of the furfuryl alcohol-based resin treatment fluid into the wellbore; wherein the substituted amine acid treatment fluid comprises a substituted amine acid salt and a solvent. The method further comprises contacting the resin-contacted unconsolidated particulates with the substituted amine acid treatment fluid.

Additionally or alternatively, the method may include one or more of the following features individually or in combination. The unconsolidated particulates may comprise clay at a concentration of 5% to 50%. The unconsolidated particulates may comprise clay at a concentration of 20% to 50%. The substituted amine acid treatment fluid may further comprise a corrosion inhibitor. The corrosion inhibitor may comprise acetylenic alcohols, aromatic aldehydes, aliphatic aldehydes, alkylphenones, alkylated bisphenol compounds, amides, amines, quaternary amine salts, amine substituted heterocycles, imines, iminium salts, triazoles, pyridine derivatives, pyridinium derivatives, quinoline, quinoline analogs, thiourea-based compounds, thiosemicarbazides, thioisocyanates, and any combinations. The substituted amine acid treatment fluid may further comprise a corrosion inhibitor intensifier. The unconsolidated particulates may comprise sand disposed within a subterranean formation penetrated by the wellbore. The unconsolidated particulates may comprise proppant. The unconsolidated particulates may comprise a particle size of less than 100 microns. The substituted amine acid treatment fluid may further comprise a base fluid. The ratio of the substituted amine acid salt to the furfuryl alcohol-based resin may be in a range of about 2:1 to about 10:1. The substituted amine acid salt may be produced from the reaction on an acid and an alkanolamine selected from the group consisting of monoethanolamine, monoisopropylamine, diethanolamine, triethanolamine, tetraethanolamine diamine, and any combination thereof.

Provided are treatment fluids for consolidating unconsolidated particulates in accordance with the disclosure and the illustrated Figures. An example treatment fluid comprises a substituted amine acid salt and a solvent.

Additionally or alternatively, the treatment fluid may include one or more of the following features individually or in combination. The substituted amine acid salt may be used to consolidate unconsolidated particulates previously contacted with a furfuryl alcohol-based resin treatment fluid. The unconsolidated particulates may comprise clay at a concentration of 5% to 50%. The unconsolidated particulates may comprise clay at a concentration of 20% to 50%. The substituted amine acid treatment fluid may further comprise a corrosion inhibitor. The corrosion inhibitor may comprise acetylenic alcohols, aromatic aldehydes, aliphatic aldehydes, alkylphenones, alkylated bisphenol compounds, amides, amines, quaternary amine salts, amine substituted heterocycles, imines, iminium salts, triazoles, pyridine derivatives, pyridinium derivatives, quinoline, quinoline analogs, thiourea-based compounds, thiosemicarbazides, thioisocyanates, and any combinations. The substituted amine acid treatment fluid may further comprise a corrosion inhibitor intensifier. The unconsolidated particulates may comprise sand disposed within a subterranean formation penetrated by the wellbore. The unconsolidated particulates may comprise proppant. The unconsolidated particulates may comprise a particle size of less than 100 microns. The substituted amine acid treatment fluid may further comprise a base fluid. The ratio of the substituted amine acid salt to the furfuryl alcohol-based resin may be in a range of about 2:1 to about 10:1. The substituted amine acid salt may be produced from the reaction on an acid and an alkanolamine selected from the group consisting of monoethanolamine, monoisopropylamine, diethanolamine, triethanolamine, tetraethanolamine diamine, and any combination thereof.

Provided are systems for consolidating unconsolidated particulates in accordance with the disclosure and the illustrated Figures. An example system comprises a furfuryl alcohol-based resin treatment fluid comprising a furfuryl alcohol-based resin and a diluent. The system further comprises a substituted amine acid treatment fluid comprising a substituted amine acid salt and a solvent.

Additionally or alternatively, the system may include one or more of the following features individually or in combination. The system may additionally comprise unconsolidated particulates within a subterranean formation penetrated by a wellbore. The unconsolidated particulates may be unconsolidated proppant particulates. The unconsolidated particulates may comprise clay at a concentration of 5% to 50%. The unconsolidated particulates may comprise clay at a concentration of 20% to 50%. The substituted amine acid treatment fluid may further comprise a corrosion inhibitor. The corrosion inhibitor may comprise acetylenic alcohols, aromatic aldehydes, aliphatic aldehydes, alkylphenones, alkylated bisphenol compounds, amides, amines, quaternary amine salts, amine substituted heterocycles, imines, iminium salts, triazoles, pyridine derivatives, pyridinium derivatives, quinoline, quinoline analogs, thiourea-based compounds, thiosemicarbazides, thioisocyanates, and any combinations. The substituted amine acid treatment fluid may further comprise a corrosion inhibitor intensifier. The unconsolidated particulates may comprise sand disposed within a subterranean formation penetrated by the wellbore. The unconsolidated particulates may comprise proppant. The unconsolidated particulates may comprise a particle size of less than 100 microns. The substituted amine acid treatment fluid may further comprise a base fluid. The ratio of the substituted amine acid salt to the furfuryl alcohol-based resin may be in a range of about 2:1 to about 10:1. The substituted amine acid salt may be produced from the reaction on an acid and an alkanolamine selected from the group consisting of monoethanolamine, monoisopropylamine, diethanolamine, triethanolamine, tetraethanolamine diamine, and any combination thereof.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of the various components and steps." Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for consolidating unconsolidated particulates, the method comprising:
    introducing a furfuryl alcohol-based resin treatment fluid into a wellbore; wherein the furfuryl alcohol-based resin treatment fluid comprises:
        a furfuryl alcohol-based resin, and
        a diluent;
    contacting the unconsolidated particulates within the wellbore with the furfuryl alcohol-based resin treatment fluid to form resin-contacted unconsolidated particulates;
    introducing a substituted amine acid treatment fluid into the wellbore after the introduction of the furfuryl alcohol-based resin treatment fluid into the wellbore; wherein the substituted amine acid treatment fluid comprises:
        a substituted amine acid salt; wherein the substituted amine acid salt is the reaction product of an alkanolamine and a mineral acid, and
        a solvent; and
    contacting the resin-contacted unconsolidated particulates with the substituted amine acid treatment fluid.

2. The method of claim 1, wherein the unconsolidated particulates comprise clay at a concentration of 5% to 50%.

3. The method of claim 1, wherein the unconsolidated particulates comprise clay at a concentration of 20% to 50%.

4. The method of claim 1, wherein the substituted amine acid treatment fluid further comprises a corrosion inhibitor.

5. The method of claim 4 wherein the substituted amine acid treatment fluid further comprises a corrosion inhibitor intensifier.

6. The method of claim 1, wherein the unconsolidated particulates comprise sand disposed within a subterranean formation penetrated by the wellbore.

7. The method of claim 1, wherein the unconsolidated particulates comprise proppant.

8. The method of claim 1, wherein the unconsolidated particulates comprise particulates having a particle size of 0.1 micron to 100 microns.

9. The method of claim 1, wherein the substituted amine acid treatment fluid further comprises a base fluid.

10. The method of claim 1, wherein the ratio of the substituted amine acid salt to the furfuryl alcohol-based resin is in a range of about 2:1 to about 10:1.

* * * * *